United States Patent [19]

Parsons

[11] Patent Number: 5,714,409
[45] Date of Patent: Feb. 3, 1998

[54] METHOD AND APPARATUS FOR PACKAGING A VEHICLE SENSOR AND INTEGRATED CIRCUIT CHIP

[75] Inventor: Mark Andrew Parsons, Rochester, Mich.

[73] Assignee: Ford Motor Company, Dearborn, Mich.

[21] Appl. No.: 786,462

[22] Filed: Jan. 21, 1997

[51] Int. Cl.⁶ .................................................. H01L 21/60
[52] U.S. Cl. .......................... 430/51; 437/50; 437/55
[58] Field of Search .............................. 438/50, 51, 54, 438/55

[56] References Cited

U.S. PATENT DOCUMENTS

| | | | |
|---|---|---|---|
| 3,417,361 | 12/1968 | Heller et al. | 438/51 |
| 4,850,227 | 7/1989 | Luettgen et al. | 73/708 |
| 5,377,524 | 1/1995 | Wise et al. | 73/4 R |
| 5,399,903 | 3/1995 | Rostoker et al. | 257/666 |
| 5,424,249 | 6/1995 | Ishibashi | 438/51 |
| 5,495,414 | 2/1996 | Spangler et al. | 364/424.05 |
| 5,525,834 | 6/1996 | Fischer et al. | 257/691 |
| 5,532,187 | 7/1996 | Schreiber-Prillwitz et al. | 438/51 |

*Primary Examiner*—Kevin Picardat
*Attorney, Agent, or Firm*—Peter Abolins; Roger L. May

[57] ABSTRACT

An apparatus for packaging a vehicle sensor and integrated circuit chip includes a ceramic substrate having an opening formed therein. A sensor is secured within the opening. An integrated circuit chip is secured within the opening in electrical communication with the sensor. A pair of electrical connectors are secured on the ceramic substrate in electrical communication with the integrated circuit chip. A metal lid is secured over the opening on the ceramic housing to enclose the integrated circuit chip and sensor. A molded plastic coating encloses the ceramic housing and metal lid, and the electrical connectors extend from the plastic coating. The sensor may be a pressure sensor or acceleration sensor.

7 Claims, 2 Drawing Sheets

METHOD AND APPARATUS FOR PACKAGING A VEHICLE SENSOR AND INTEGRATED CIRCUIT CHIP

TECHNICAL FIELD

The present invention relates to vehicle sensors, and more particularly to a method and apparatus for packaging a vehicle sensor and integrated circuit chip.

BACKGROUND OF THE INVENTION

Current vehicle designs include various sensors, such as air bag deployment, body acceleration sensors, manifold pressure sensors, barometric pressure sensors, fuel injection pressure sensors, etc. Packaging of such sensors in vehicles is challenging due to the limited space available in desired locations, particularly with side air bag satellite sensors. These sensors are typically packaged by mounting the sensor in a ceramic housing, and then mounting the ceramic housing onto a printed wiring board (PWB), which is typically a fiberglass component which acts as a substrate system. The printed wiring board also supports an independently packaged integrated circuit chip, which is mounted on the printed wiring board in electrical communication with the ceramic substrate. Capacitors and other discrete electronic components are then mounted onto the printed wiring board in electrical communication with the integrated circuit chip and ceramic housing. This entire printed wiring board assembly is then supported within a plastic housing for mounting in the vehicle.

Accordingly, the prior art sensor support packaging devices require that the integrated circuit chip be independently mounted in a plastic package, then mounted on a printed wiring board substrate, which also holds the ceramic housing which encloses a vehicle sensor, and other discrete components are mounted on the printed wiring board independently.

This packaging system may result in an undesirably large package which requires substantial manufacturing and assembly costs.

DISCLOSURE OF THE INVENTION

The present invention overcomes the above-references shortcomings of prior art vehicle sensor and integrated circuit packaging systems by providing a method and apparatus for packaging a vehicle sensor and integrated circuit chip in which both the vehicle sensor and the integrated circuit chip are mounted directly inside a ceramic housing, and the assembly is overmolded with a plastic cover which is configured to facilitate attachment in the vehicle. A pair of electrical connectors extend from the plastic housing in electrical communication with the integrated circuit chip and sensor. The sensor could be a pressure sensor or acceleration sensor.

More specifically, the present invention provides a method of packaging a vehicle sensor and integrated circuit chip, comprising the following steps: (1) providing a ceramic substrate having an opening formed therein; (2) installing a sensor onto the ceramic substrate in the opening; (3) installing an integrated circuit chip onto the ceramic substrate in the opening in electrical communication with the sensor; (4) installing a pair of electrical connectors extending from the ceramic substrate in electrical communication with the integrated circuit chip; (5) installing a metal lid over the opening on the ceramic housing to enclose the integrated circuit chip and sensor; and (6) molding plastic over the ceramic housing and metal lid to enclose the ceramic housing and metal lid in a desired plastic configuration designed to facilitate attachment in the vehicle, while allowing the pair of electrical connectors to extend from the plastic molding.

The present invention also provides an apparatus for packaging a vehicle sensor and integrated circuit chip as described in the method steps recited above.

Accordingly, an object of the present invention is to provide a method and apparatus for packaging a vehicle sensor and integrated circuit chip in a vehicle in a manner in which the prior art packaging system's printed wiring board is eliminated.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
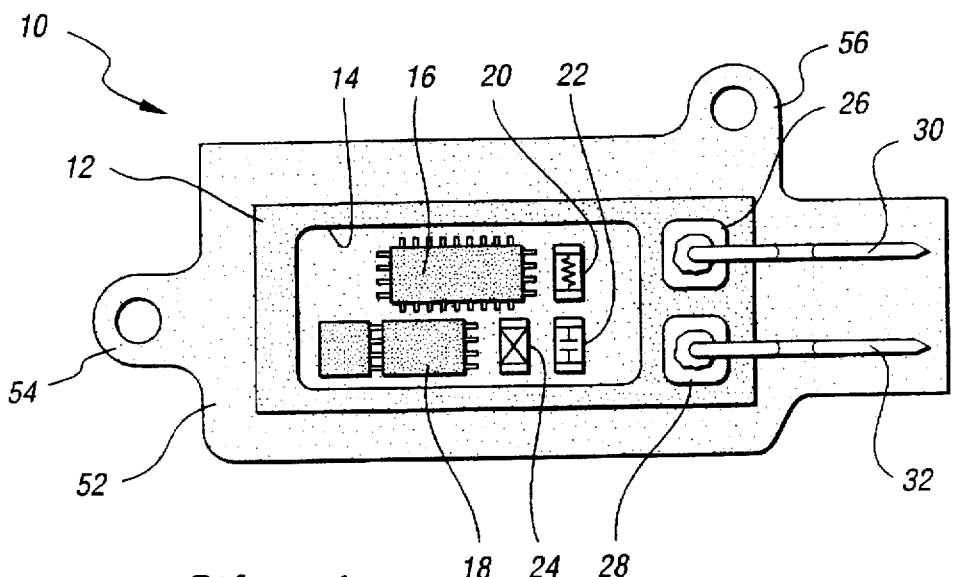
FIG. 1 shows a plan view of an apparatus for packaging a vehicle sensor and integrated circuit chip in accordance with the present invention.
Figure 2:
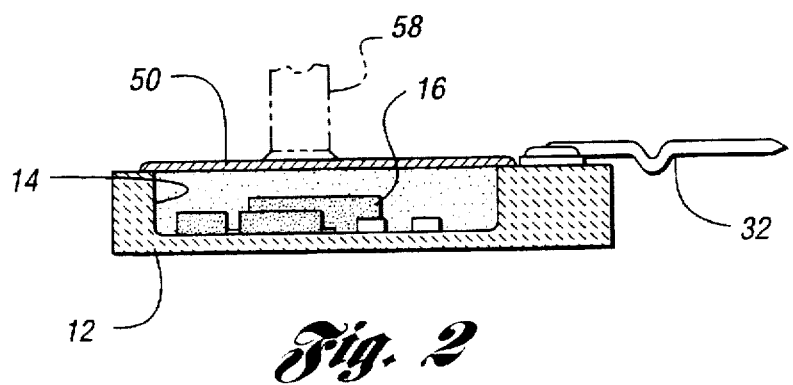
FIG. 2 shows a vertical cross-sectional view of a ceramic substrate, metal lid, sensor and integrated circuit chip in accordance with the embodiment shown in FIG. 1.
Figure 3:
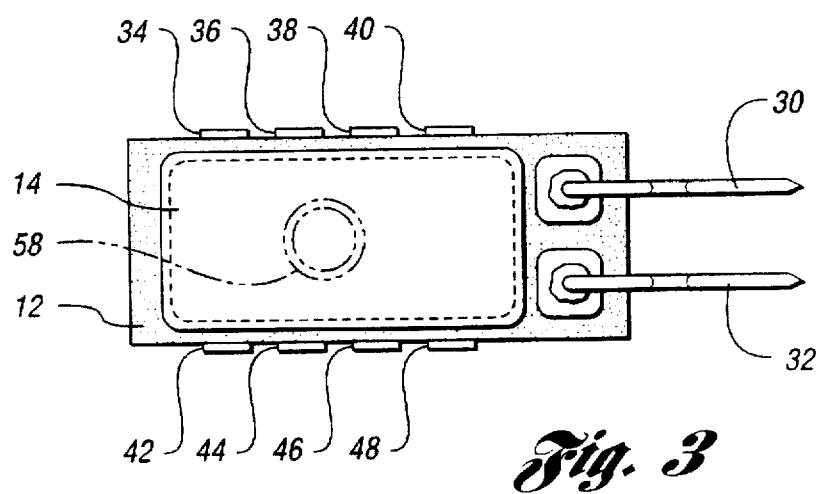
FIG. 3 shows a plan view of the assembly shown in FIG. 2.

FIG. 1 shows a plan view of a vehicle acceleration sensor and integrated circuit packaging assembly 10 in accordance with a first embodiment of the present invention. As further illustrated in FIGS. 2 and 3, this invention includes a ceramic substrate 12 having an opening 14 formed therein.

Rather than independently packaging the integrated circuit chip and installing it onto a printed wiring board, as discussed above with respect to the prior art, in the present invention the integrated circuit chip 16 is mounted directly on the ceramic substrate 12 within the opening 14 formed in the substrate. The acceleration sensor 18 is also mounted to the ceramic substrate 12 within the opening 14 in electrical communication with the integrated circuit chip 16. The various other discrete electronic components 20, 22, 24, such as capacitors, etc., are also mounted within the opening 14 in electrical communication with the integrated circuit chip 16.

The ceramic substrate 12 is a multi-layer component having circuitry disposed within the layers. The ceramic substrate 12 also includes plated attachment surfaces 26,28 to which connector pins 30,32 are brazed.

The ceramic substrate 12 is further provided with a plurality of standard side plating surfaces 34, 36, 38, 40, 42, 44, 46, 48 which allow ease of manufacturing for calibrating and programming of the integrated circuit chip 16. Once calibration is complete, these plating surfaces are deactivated. The calibration and programming is done at the ceramic level.

A metal lid 50 is then installed over the opening 14 on the ceramic substrate 12 to enclose the integrated circuit chip 16, acceleration sensor 18, and discrete electronic components 20, 22, 24 hermetically within the ceramic substrate 12. After the metal lid 50 is secured over the opening 14, the ceramic substrate 12 will be placed within an injection mold, and a plastic overmold body 52 will be molded over the ceramic substrate 12 and metal lid 50 to enclose the ceramic substrate 12 and its contents therein. The plastic overmold body is molded to form attachment features 54,56 which act as a means for attaching the packaging assembly 10 within a vehicle. The attachment features will be configured for the particular vehicle application. The plastic overmold body 52 is configured such that the connector pins 30,32 extend therefrom to facilitate electrical communication with the vehicle side air bag deployment system in the first embodiment of the invention.

The ceramic substrate 12 and metal lid 50 provide both hermetic sealing and electromagnetic interference resistance for the acceleration sensor 18. The metallization over the ceramic substrate 12 provides substantial EMI protection. The plastic overmold body 52 is preferably 3–5 millimeters thick, but this thickness could vary, of course, within the scope of the present invention.

In this configuration, the prior art printed wiring board has been eliminated and the size of the assembly is reduced because the integrated circuit chip 16 is packaged directly within the ceramic substrate 12, as opposed to requiring the additional printed wiring board for mounting thereof. This packaging technique encloses the entire electronics and sensor system in a small, robust package. The exact mounting configuration is dictated by the plastic overmold body 52 shape which is tailored for the specific vehicle type.

In other embodiments of the invention, the same strategy may be used for a pressure sensor assembly, such as one which senses manifold pressure, barometric pressure, fuel injection system pressure, etc. This is accomplished by including an inlet port in the metal lid, such as the port 58 shown in phantom in FIG. 2, to allow the fluid which is to be sensed to enter into the opening 14 in the ceramic substrate 12 to engage the pressure sensor disposed within the ceramic substrate 12.

Figure 4:
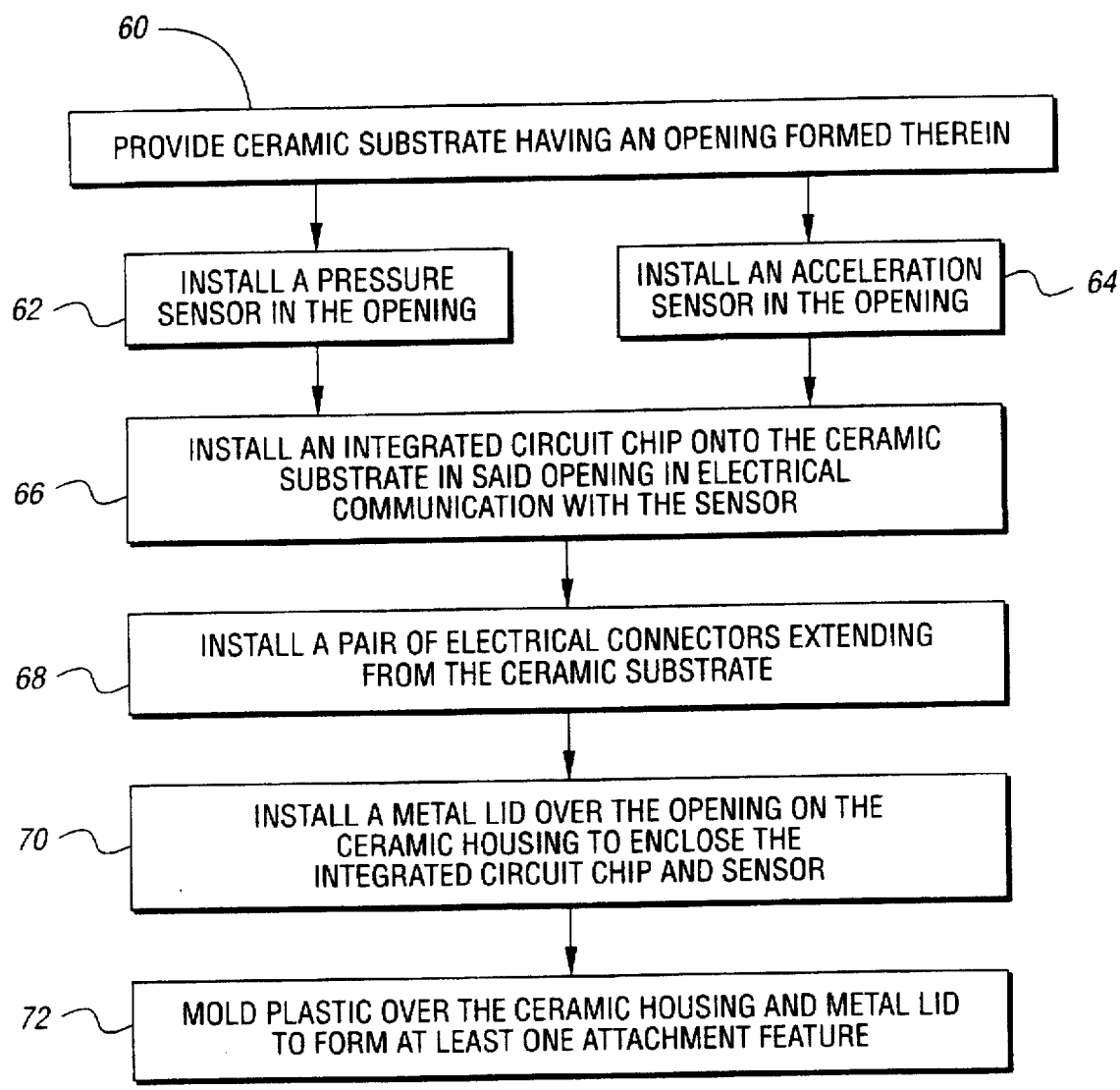
FIG. 4 shows a flow chart in accordance with the present invention.

Turning to FIG. 4, a method of packaging a vehicle sensor and integrated circuit chip is described in accordance with the present invention. The method comprises the following steps: providing a ceramic substrate having an opening formed therein (step 60); installing a pressure or acceleration sensor in the opening (steps 62 or 64); installing an integrated circuit chip onto the ceramic substrate in the opening in electrical communication with the sensor (step 66); installing a pair of electrical connectors extending from the ceramic substrate (step 68); installing a metal lid over the opening on the ceramic housing to enclose the integrated circuit chip and sensor (step 70); and molding plastic over the ceramic housing and metal lid to form at least one attachment feature (step 72).

While the best modes for carrying out the invention have been described in detail, those familiar with the art to which this invention relates will recognize various alternative designs and embodiments for practicing the invention within the scope of the appended claims.

What is claimed is:

1. A method of packaging a vehicle sensor and integrated circuit chip, comprising:

providing a ceramic substrate having an opening formed therein;

installing a sensor onto the ceramic substrate in said opening;

installing an integrated circuit chip onto the ceramic substrate in said opening in electrical communication with the sensor;

installing a pair of electrical connectors extending from the ceramic substrate in electrical communication with the integrated circuit chip;

installing a metal lid over the opening on the ceramic housing to enclose the integrated circuit chip and sensor; and molding plastic over the ceramic housing and metal lid to enclose the ceramic housing and metal lid in a desired plastic configuration designed to facilitate attachment in the vehicle while allowing the pair of electrical connectors to extend from the plastic molding.

2. The method of claim 1, further comprising installing additional electronic components within the opening prior to installation of the metal lid.

3. The method of claim 1, wherein said step of molding plastic over the ceramic housing and metal lid further comprises forming at least one attachment feature.

4. The method of claim 3, wherein said step of installing a pair of electrical connectors comprises brazing a pair of electrical connectors.

5. The method of claim 1, wherein said step of installing a sensor comprises installing a pressure sensor.

6. The method of claim 1, wherein said step of installing a sensor comprises installing an acceleration sensor.

7. A method of packaging a vehicle sensor and integrated circuit chip, comprising:

providing a ceramic substrate having an opening formed therein;

installing a sensor onto the ceramic substrate in said opening;

installing an integrated circuit chip onto the ceramic substrate in said opening in electrical communication with the sensor;

brazing a pair of electrical connectors extending from the ceramic substrate in electrical communication with the integrated circuit chip;

installing a metal lid over the opening on the ceramic housing to enclose the integrated circuit chip and sensor; and molding plastic over the ceramic housing and metal lid to enclose the ceramic housing and metal lid in a desired plastic configuration which includes at least one attachment feature designed to facilitate attachment in the vehicle, while allowing the pair of electrical connectors to extend from the plastic molding.

* * * * *